United States Patent
Booss et al.

(10) Patent No.: US 10,545,874 B2
(45) Date of Patent: Jan. 28, 2020

(54) RECLAMATION OF CACHE RESOURCES

(71) Applicant: SAP SE, Walldorf (DE)

(72) Inventors: Daniel Booss, Angelbachtal (DE); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 69 days.

(21) Appl. No.: 15/900,120

(22) Filed: Feb. 20, 2018

(65) Prior Publication Data

US 2019/0258580 A1  Aug. 22, 2019

(51) Int. Cl.
*G06F 12/00* (2006.01)
*G06F 12/0891* (2016.01)
*G06F 12/123* (2016.01)

(52) U.S. Cl.
CPC ........ *G06F 12/0891* (2013.01); *G06F 12/123* (2013.01); *G06F 2212/1044* (2013.01)

(58) Field of Classification Search
CPC .............. G06F 12/0891; G06F 12/123; G06F 2212/1044
See application file for complete search history.

(56) References Cited

U.S. PATENT DOCUMENTS

| | | | | |
|---|---|---|---|---|
| 6,272,598 | B1* | 8/2001 | Arlitt | G06F 16/9574 711/133 |
| 9,690,696 | B1* | 6/2017 | Hefner | G06F 12/0246 |
| 2005/0268037 | A1* | 12/2005 | Hama | G06F 11/3452 711/118 |
| 2011/0289533 | A1* | 11/2011 | White | H04N 7/17318 725/46 |
| 2012/0226871 | A1* | 9/2012 | Cantin | G06F 12/123 711/135 |
| 2013/0254491 | A1* | 9/2013 | Coleman | G06F 12/126 711/133 |
| 2014/0189247 | A1* | 7/2014 | Hughes | G06F 12/1009 711/136 |
| 2014/0281169 | A1* | 9/2014 | Mehrotra | G06F 12/0866 711/103 |
| 2015/0067266 | A1* | 3/2015 | Jafri | G06F 12/0804 711/136 |
| 2015/0134914 | A1* | 5/2015 | Ash | G06F 12/0891 711/136 |
| 2017/0315932 | A1* | 11/2017 | Moyer | G06F 12/0862 |
| 2017/0329720 | A1* | 11/2017 | Bedi | G06F 12/123 |
| 2018/0113815 | A1* | 4/2018 | Eckert | G06F 12/126 |
| 2018/0336253 | A1* | 11/2018 | Sekharan | G06F 12/0875 |

\* cited by examiner

*Primary Examiner* — Prasith Thammavong
(74) *Attorney, Agent, or Firm* — Mintz Levin Cohn Ferris Glovsky and Popeo, P.C.

(57) ABSTRACT

A method may include dividing, into a first portion of memory resources and a second portion of memory resources, a plurality of memory resources included in a cache coupled with a database. The plurality of memory resources included in the cache may store data from the database. The first portion of memory resources may be occupied by data assigned to a first weight class. The second portion of memory resources may be occupied by data assigned to a second weight class. The first portion of memory resources may be selected based at least on the first weight class and an age of at least some of the data occupying the first portion of memory resources. In response to the selection of the first portion of memory resources, the first portion of memory resources may be reclaimed. Related systems and articles of manufacture, including computer program products, are also provided.

18 Claims, 6 Drawing Sheets

RECLAMATION OF CACHE RESOURCES

TECHNICAL FIELD

The subject matter described herein relates generally to computing optimization and more specifically to cache management.

BACKGROUND

Data stored in a database may be accessed in a manner that gives rise to temporal locality and/or spatial locality. Temporal locality may refer to the tendency for the same data to be accessed repeatedly over a short period of time. Meanwhile, spatial locality may refer to the tendency to access, within a short period of time, data from adjacent storage locations within the database. The caching of data may exploit both temporal locality and spatial locality. For example, a portion of the data in the database may be stored in a cache (e.g., an in-memory database and/or the like) in order to expedite subsequent requests for the same data. The data stored in the cache may include recently accessed data and/or data from adjacent storage locations.

SUMMARY

Systems, methods, and articles of manufacture, including computer program products, are provided for reclaiming memory resources. In one aspect, there is provided a system. The system may include at least one data processor and at least one memory. The at least one memory may store instructions that result in operations when executed by the at least one data processor. The operations may include: dividing, into a first portion of memory resources and a second portion of memory resources, a plurality of memory resources included in a cache coupled with a database, the plurality of memory resources storing data from the database, the first portion of memory resources being occupied by data assigned to a first weight class, and the second portion of memory resources being occupied by data assigned to a second weight class; selecting, based at least on the first weight class and an age of at least some of the data occupying the first portion of memory resources, the first portion of memory resources; and in response to the selection of the first portion of memory resources, reclaiming the first portion of memory resources.

In some variations, one or more features disclosed herein including the following features can optionally be included in any feasible combination. The plurality of memory resources included in the cache may be partitioned, based at least on a weight class assigned to data occupying each of the plurality of memory resources, into a first subset of memory resources and a second subset of memory resources. The first subset of memory resources may be associated with the first weight class and the second subset of memory resources may be associated with the second weight class. The first subset of memory resources may be sorted based at least on an age of data occupying the first subset of memory resources. The sorted first subset of memory resource may be divided into the first portion of memory resources and a third portion of memory resources. The second subset of memory resources may be sorted based at least on an age of data occupying the second subset of memory resources. The sorted second subset of memory resources may be divided into the second portion of memory resources and a fourth portion of memory resources.

In some variations, the first subset of memory resources may be divided such that the data occupying the first portion of memory resources is accessed more recently than data occupying the third portion of memory resources. The second subset of memory resources may be divided such that the data occupying the second portion of memory resources is accessed more recently than data occupying the fourth portion of memory resources. The first portion of memory resources may be selected based at least on a ratio of the first weight class relative to an age of a least recently accessed data occupying the first portion of memory resources. The first portion of memory resources may be selected based at least on the ratio associated with the first portion of memory resources being higher than a respective ratio of the second portion of memory resources, the third portion of memory resources, and/or the fourth portion of memory resources.

In some variations, the second portion of memory resources may be selected based ate last on the second weight class and an age of at least some of the data occupying the second portion of memory resources. In response to the selection of the second portion of memory resources, the second portion of memory resources may be reclaimed. The first portion of memory resources and the second portion of memory resources may be reclaimed asynchronously In some variations, the reclamation of the first portion of memory resources may include marking the data occupying the first portion of memory resources to indicate that the data can be overwritten with other data from the database.

In some variations, the first weight class may correspond to an importance andaor a priority of the data occupying the first portion of memory resources. The second weight class may correspond to an importance and/or a priority of the data occupying the second portion of memory resources.

In some variations, whether a quantity of memory resources included in the first portion of memory resources and/or the second portion of memory resources exceeds a total quantity of memory resources requiring reclamation may be determined. In response to determining that the quantity of memory resources included in the first portion of memory resources and/or the second portion of memory resources exceeds the total quantity of memory resources requiring reclamation, a first memory resource from the plurality of memory resources may be reclaimed before reclaiming a second memory resource from the plurality of memory resources. The first memory resource may be reclaimed before the second memory resource based at least on a respective weight class and/or a respective age of data occupying the first memory resource and the second memory resource.

In some variations, in response to determining that the quantity of memory resources included in the first portion of memory resources and/or the second portion of memory resources does not exceed the total quantity of memory resources requiring reclamation, the first portion of memory resources and/or the second portion of memory resources may be selected for reclamation. The total quantity of memory resources requiring reclamation may be updated based at least on the quantity of memory resources included in the first portion of memory resources and/or the second portion of memory resources.

In some variations, the first portion of memory resources may be selected in response to a shortage of memory resources at the cache for storing additional data from the database. The data occupying the first portion of memory resources may be replaced with the additional data from the database.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or statements or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Caching a portion of data from a database may expedite subsequent requests for the same data because data stored in a cache may be accessed faster than data stored in the database. But the cache may provide a finite quantity of memory resources, which may therefore necessitate the reclamation of memory resources from time to time in order to make space for new data loaded from the database. Reclaiming a memory resource may include, for example, marking the data currently occupying the memory resource to indicate that this data may be overwritten with the new data loaded from the database. However, reclaiming memory resources may be a time-consuming process, especially when a large quantity of memory resources must be identified and reclaimed in order to accommodate new data from the database. As such, in some example embodiments, memory resources in a cache may be divided into buckets of memory resources and at least one bucket of memory resources may be selected for reclamation. A bucket of memory resources may refer to a portion and/or an allocation of memory resources from the cache. Moreover, multiple buckets of resources may be reclaimed asynchronously such that more than one bucket of memory resources may be reclaimed at once.

Figure 1:
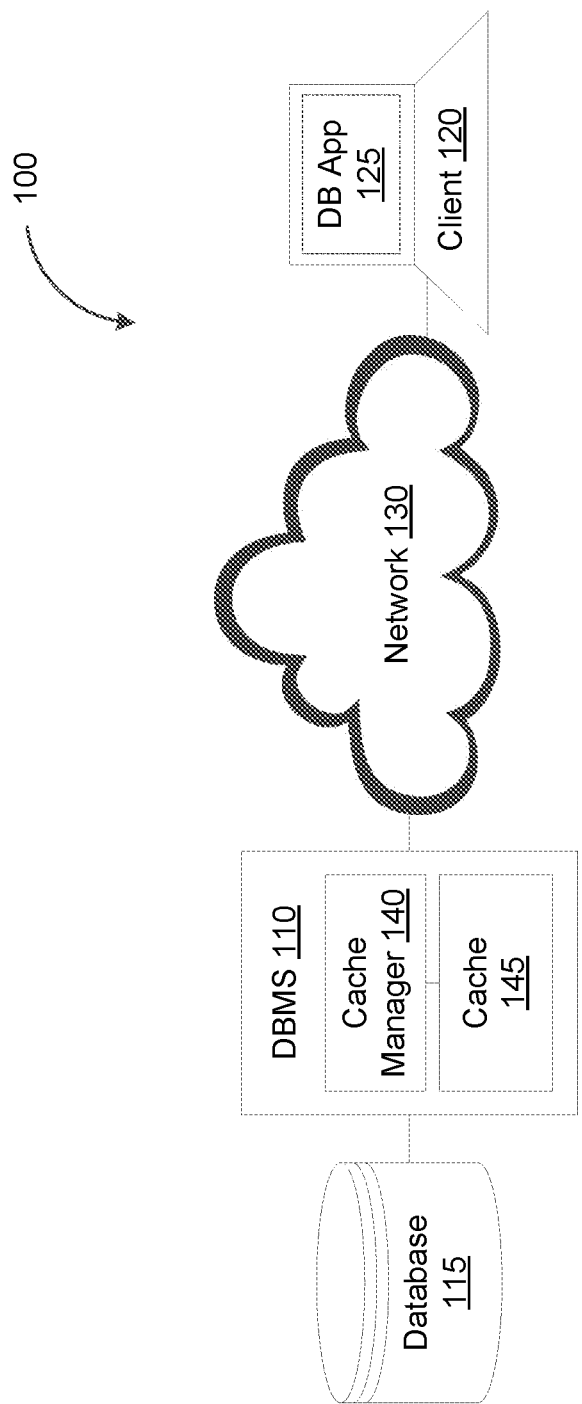
FIG. 1 depicts a system diagram illustrating an integrated data storage system, in accordance with some example embodiments.

FIG. 1 depicts a system diagram illustrating a data storage system 100, in accordance with some example embodiments. Referring to FIG. 1, the data storage system 100 may include a database management system 110, which may be coupled with a database 115. The database 115 may be any type of database including, for example, a relational database, a non-SQL (NoSQL) database, and/or the like. Meanwhile, the database management system 110 may support a variety of operations for accessing data held in the database 115. For example, at least some of the data in the database 115 may be retrieved, updated, and/or deleted by the database management system 110 executing one or more database queries including, for example, structured query language (SQL) statements.

Referring again to FIG. 1, the database management system 110 may be communicatively coupled with a client 120 via a network 130. The network 130 may be any wired and/or wireless network including, for example, a wide area network (WAN), a local area network (LAN), a virtual local area network (VLAN), a public land mobile network (PLMN), the Internet, and/or the like. As shown in FIG. 1, the client 120 may interact with the database management system 130 via a database application 125 at the client 120. For example, the client 120 may access data held in the database 115 by at least sending, via the database application 125, one or more database queries (e.g., SQL statements) to the database management system 110.

The database management system 110 may include a cache manager 140, which may be coupled with a cache 145. The cache 145 may be any type of cache including, for example, an in-memory database and/or the like. Moreover, the cache 145 may provide a plurality of memory resources. As used herein, a memory resource at the cache 145 may refer to a quantity of the available memory at the cache 145. For example, where the cache 145 may be implemented as an in-memory database, a memory resource within the cache 145 may refer to a row and/or a column within the in-memory database.

In some example embodiments, the cache 145 may be configured to store a portion of the data from the database 115. For example, at least a portion of the data required to execute a database query from the client 120 and/or data from adjacent storage locations in the database 115 may be stored at the cache 145. Caching the data required execute the database query and/or data from adjacent storage locations at the cache 145 may expedite subsequent database queries because the cache 145 may support a faster data retrieval than the database 115. However, the quantity of memory resources at the cache 145 may be limited. As such, memory resources at the cache 145 may be reclaimed from time to time in order to accommodate new data from the database 115. It should be appreciated that a memory resource at the cache 145 may be reclaimed in any manner including, for example, by marking the data currently occupying the memory resource to indicate that the data may be overwritten with other data from the database 115.

The cache manager 140 may be configured to identify which memory resources at the cache 145 may be reclaimed in order to accommodate new data from the database 115. As noted, reclaiming a memory resource may enable data currently occupying the memory resource to be replaced with other data from the database 115. In order to determine which memory resources in the cache 145 to reclaim, the cache manager 140 may partition the memory resources at the cache 145 into subsets of resources, for example, based on the weight class assigned to the data currently occupying each memory resource in the cache 145.

It should be appreciated that data may be assigned to a weight class (e.g., by a user) that corresponds to an importance and/or priority associated with the data and/or type of data. Data assigned to a higher weight class may be maintained in the cache 145 longer than data assigned to a lower weight class because the cache manager 140 may be configured to reclaim resources occupied by the lower weight class data before the resources occupied by the higher weight class data. For example, the cache 145 may hold data that was stored in the columns of a database table in the database 115 or in memory pages at the database 115. The data that is stored in the columns of the database table may be required for both read operations and write operations whereas the data that is stored in memory pages may only be required for write operations. As such, the data that is stored in the columns of the database table may be assigned to a higher weight class than the data that is stored in memory pages. In doing so, resources occupied by data from memory pages may be reclaimed before resources occupied by data from the columns of the database table.

Furthermore, in some example embodiments, each subset of memory resources may be further divided into buckets of memory resources. Each bucket of memory resources may include some but not all of the memory resources in the cache. Moreover, a subset of memory resources may be divided into buckets of memory resources based on an age of the data occupying each of the memory resources included in the subset of memory resources. The age of data currently occupying a memory resource may correspond to when the data was last accessed, for example, by a read operation, a write operation, and/or the like.

The cache manager 140 select one or more buckets of memory resources to reclaim by at least applying one or more reclamation criteria across the buckets of resources. For example, the cache manager 140 may apply reclamation criteria configured to identify, within each subset of memory resources, one or more buckets of memory resources containing the least recently accessed data. According to some example embodiments, the cache manger 140 may reclaim memory resources at the cache 145 in an asynchronous manner. That is, the cache manager 140 may begin reclaiming one bucket of memory resources without having to wait for the reclamation of another bucket of memory resources to finish. Instead, multiple buckets of resources may be reclaimed simultaneously, thereby reducing the quantity of time required to unload reclaim memory resources at the cache 145.

Figure 2A:
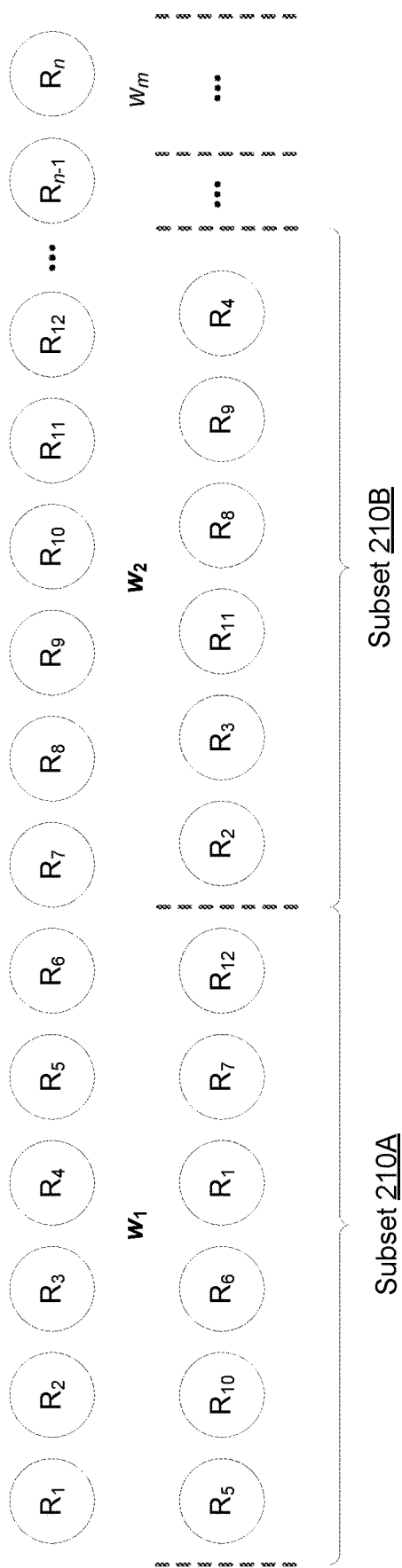
FIG. 2A depicts a separation of memory resources into subsets of memory resources, in accordance with some example embodiments.

To further illustrate, FIG. 2A depicts a partitioning of memory resources into subsets of memory resources, in accordance with some example embodiments. As shown in FIG. 2A, the cache 145 may include an n quantity of memory resources from $R_1$ through $R_n$. The data currently occupying each of the memory resources from $R_1$ through $R_n$ may be assigned to a weight class from an m quantity of weight classes from $w_1$ to $w_m$. For example, the data currently occupying a first memory resource $R_1$ may be assigned to a first weight class $w_1$ while the data currently occupying a second memory resource $R_2$ may be assigned to a second weight class $w_2$. As noted, each weight class may reflect the importance and/or priority of the data and/or the type of data.

Referring again to FIG. 2A, the cache manager 140 may divide the n quantity of memory resources shown in FIG. 2A into an m quantity of subsets of memory resources including, for example, a first subset 210A of memory resources and a second subset 210B of memory resources. The cache manager 140 may divide the n quantity of memory resources into the m quantity of subsets of memory resources based at least on the weight class assigned to the data currently occupying each of the n quantity of memory resources. Thus, the first subset 210A of memory resources may be associated with the first weight class $w_1$ while the second subset 210B of memory resources may be associated with the second weight class $w_2$. It should be appreciated that the first subset 210A of memory resources may include a same and/or a different quantity of memory resources as the second subset 210B of memory resources.

In some example embodiments, each subset of memory resources may further be divided into buckets of memory resources, for example, based on an age of the data currently occupying each memory resource. As noted, the age of data currently occupying a memory resource may correspond to a time when the data was last accessed, for example, by a read operation, a write operation, and/or the like. Accordingly, dividing the subsets of memory resources based on the age of data may organize memory resources into buckets of memory resources that reflect the chronological order of when the data occupying each memory resource was last accessed. For instance, for buckets of memory resources within the same subset of memory resources (e.g., assigned to the same weight class), all of the data currently occupying one bucket of memory resources may either be accessed less recently or more recently than all of the data currently occupying another bucket of memory resources. Furthermore, it should be appreciated that each bucket of memory resources may include a limited quantity of memory resources. That is, the quantity of memory resource included in each bucket of memory resources may be limited to a threshold value (e.g., 1000 and/or a different quantity).

Figure 2B:
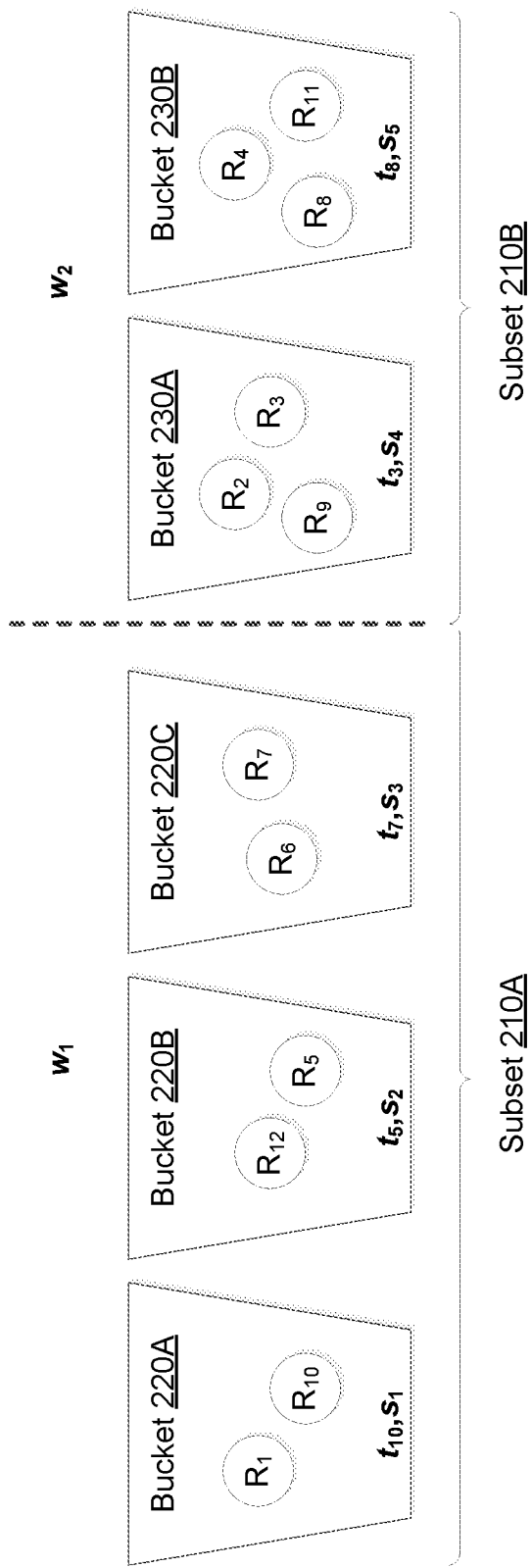
FIG. 2B depicts a separation of memory resources into buckets of memory resources, in accordance with some example embodiments.

To further illustrate, FIG. 2B depicts a division of memory resources into buckets of memory resources. As shown in FIG. 2B, the first subset of memory resources 210A may be divided into a plurality of buckets of memory resources including, for example, a first bucket 220A of memory resources, a second bucket 220B of memory resources, and/or a third bucket 220C of memory resources. The first bucket 220A of memory resources, the second bucket 220B of memory resources, and/or the third bucket 220C of memory resources may each include a limited quantity (e.g., 1000 and/or a different quantity) of memory resources. Furthermore, the first subset 210A of memory resources may be divided into the first bucket 220A of memory resources, the second bucket 220B of memory resources, and/or the third bucket 220C of memory resources based at least on an age of the data occupying each memory resource in the first subset 210A of memory resources. As such, all of data occupying the first bucket 220A of memory resources may be accessed either more recently and/or less recently than all of the data occupying the second bucket 220B of memory resources. Alternatively and/or additionally, all of the data occupying the second bucket 220B of memory resources may be accessed either more recently or less recently than all of the data currently occupying the third bucket 220C of memory resources.

Alternatively and/or additionally, the second subset 210B of memory resources may also be divided into a plurality of buckets of memory resources including, for example, a fourth bucket 230A of memory resources and/or a fifth bucket 230B of memory resources. The fourth bucket 230A of memory resources and/or the fifth bucket 230B of memory resources may each include a limited quantity (e.g., 1000 and/or a different quantity) of memory resources. Furthermore, the second subset 210B of memory resources may also be divided into the fourth bucket 230A of memory resources and/or the fifth bucket 230B of memory resources based at least on an age of the data currently occupying each memory resource within the second subset 210B of memory resources. As such, all of the data currently occupying the fourth bucket 230A of memory resources may be accessed either more recently or less recently than all of the data currently occupying the fifth bucket 230B of memory resources.

Referring again to FIG. 2B, each of the k quantity of buckets of memory resources may be associated with a time $t_n$, which may correspond to a time when the least recently accessed data in each bucket of memory resources was last accessed. For example, the first bucket 220A of memory resources, which may include the first memory resource $R_1$ and a tenth memory resource $R_{10}$, may be associated with a tenth time $t_{10}$. The tenth time $t_{10}$ may correspond to when the data occupying the tenth memory resource $R_{10}$ was last accessed whereas a first time $t_1$ may correspond to when the data occupying the first memory resource $R_1$ was last accessed. It should be appreciated that the first bucket 220A of memory resources may be associated with the tenth time $t_{10}$ if the data currently occupying the tenth memory resource $R_{10}$ was last accessed before the data occupying every other memory resource included in the first bucket 220A including, for example, the first memory resource $R_1$.

Similarly, the fourth bucket 230A of memory resources, which may include the second memory resource $R_2$, a third memory resource $R_3$, and a ninth memory resource $R_9$, may be associated with a third time $t_3$. The third time $t_3$ may correspond to when the data occupying the third memory resource $R_3$ was last accessed. The fourth bucket 230A of memory resources may be associated with the third time $t_3$ if the data currently occupying the third memory resource $R_3$ was last accessed earlier than the data occupying every other memory resource included in the fourth bucket 230A including, for example, the second memory resource $R_2$ and the ninth memory resource $R_9$.

Referring again to FIG. 2B, each of the k quantity of buckets of memory resources may further be associated with a size $s_k$, indicative of a total size and/or a total quantity of memory resources included in each bucket. For instance, the first bucket 220A of memory resources may be associated with a first size $s_1$, which may correspond to a total size and/or a total quantity of memory resources included in the first bucket 220A. The first size $s_1$ may correspond, for instance, to a total quantity of bytes of associated with the first memory resource $R_1$ and the tenth memory resource $R_{10}$. As such, reclaiming the first bucket 220A of memory resources may free up an $s_1$ quantity of bytes of memory resources. Similarly, the fourth bucket 230A may be associated with a fourth size $s_4$, which may correspond to a total size and/or a total quantity of memory resources included in the fourth bucket 230A. The fourth size $s_4$ may correspond to a total quantity of bytes associated with the second memory resource $R_2$, the third memory resource $R_3$, and the ninth memory resource $R_9$ such that reclaiming the fourth bucket 230A of memory resources may free up an $s_4$ quantity of bytes of memory resources.

In some example embodiments, the cache manager 140 may be configured to select one or more of the k quantity of buckets of memory resources for reclamation. Here, the cache manager 140 may apply one or more reclamation criteria across the k quantity of buckets of memory resources. For instance, the criteria may include evaluating a quotient $q_k$ value associated with each of the k quantity of buckets of memory resources. The quotient $q_k$ value for each of the k quantity of buckets of memory resources may be determined based on Equation (1) below.

$$q_k = \frac{T - t_n}{w_m} \quad (1)$$

wherein T may correspond to a current time and/or a time at which memory resources at the cache 145 are being reclaimed, $t_n$, may correspond to a time when the least recently accessed data in a bucket of memory resources was last accessed, and $w_m$ may correspond to the weight class associated with a bucket of memory resources.

According to some example embodiments, the cache manager 140 may compute a quotient $q_k$ value for each of the k quantity of buckets of memory resources. Furthermore, the cache manager 140 may select to reclaim one or more buckets of memory resources having the highest quotient $q_k$ values. As noted, where multiple buckets of memory resources are selected for reclamation, the cache manager 140 may reclaim the memory resources from each bucket of memory resources asynchronously. That is, if the cache manager 140 selects both the first bucket 220A of memory resources and the second bucket 220B of memory resources for reclamation, the cache manager 140 may reclaim the memory resources included in both the first bucket 220A of memory resources and the second bucket 220B of memory resources simultaneously.

Referring again to Equation (1), it should be appreciated that the value of the quotient $q_k$ associated with a bucket of memory resources may be directly proportional to the difference between T and $t_n$. This difference between T and $t_n$, may reflect how recently the least recently accessed data in a bucket of memory resource was last accessed. As such, the first bucket 220A of memory resources may more likely be selected for reclamation than the second bucket 220B of memory resources if the tenth time $t_{10}$ is less than a fifth time $t_5$ associated with the second bucket 220B of memory resources. Furthermore, as shown in Equation (1), the value of the quotient $q_n$ may be inversely proportional to the value of the weight $w_m$ associated with each bucket of memory resources. Thus, the first bucket 220A of memory resources may more likely be selected for reclamation than the fourth bucket 230A of memory resources if the first weight $w_1$ is smaller than the second weight $w_2$.

Figure 3:
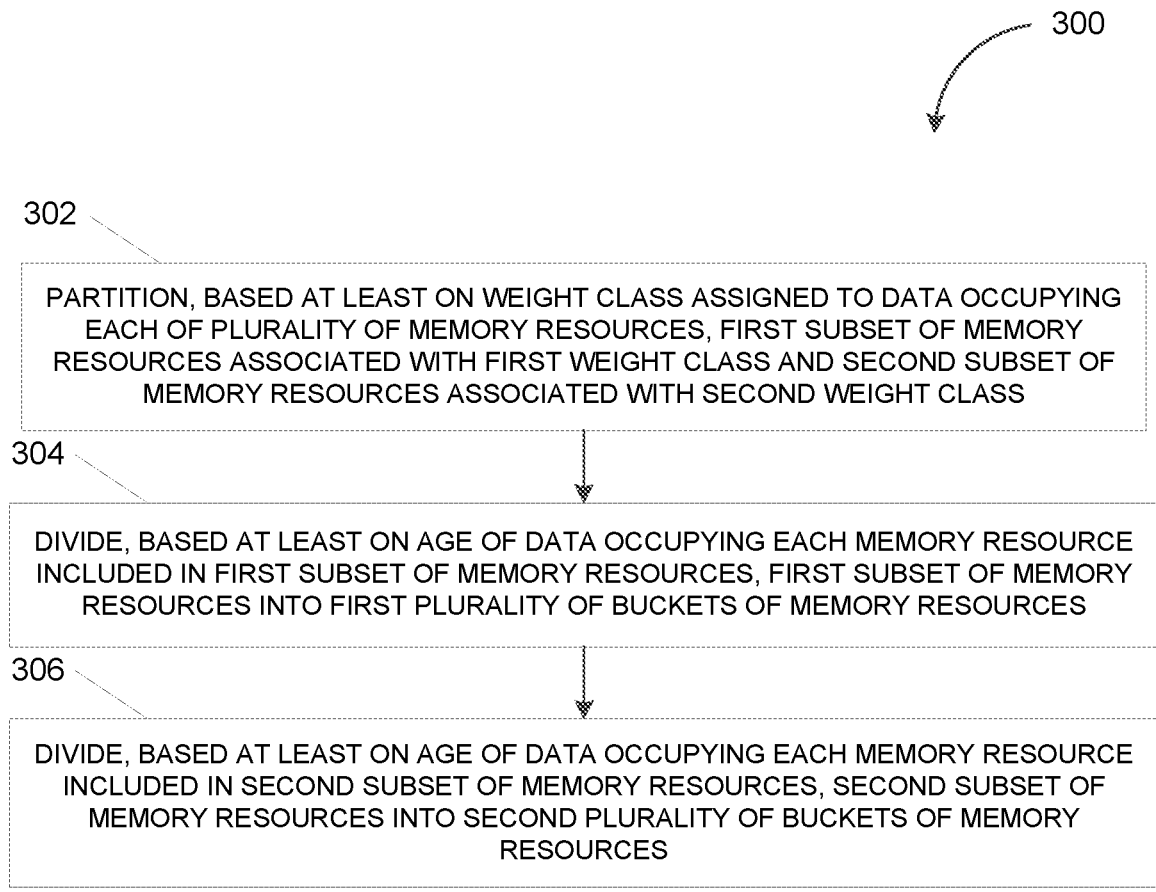
FIG. 3 depicts a flowchart illustrating a process for separating memory resources within a cache, in accordance with some example embodiments.

FIG. 3 depicts a flowchart illustrating a process 300 for dividing the memory resources in the cache 145, in accordance with some example embodiments. Referring to FIGS. 1-3, the process 300 may be performed by the cache manager 140.

At 302, a plurality of memory resources in the cache 145 may be partitioned, based at least on a weight class assigned to data occupying each of the plurality of memory resources, a first subset of memory resources associated with a first weight class and a second subset of memory resources associated with a second weight class. For example, as shown in FIG. 2A, the n quantity of memory resources in the cache 145 (e.g., $R_1$ through $R_n$) may be partitioned into the m quantity of subsets of memory resources. As noted, the cache manager 140 may partition the n quantity of memory resources based at least on the weight class assigned to the data occupying each of the n quantity of memory resources. Thus, where there may be an m quantity of weight classes, the n quantity of memory resources in the cache 145 may be partitioned into the m quantity of subsets of memory resources including, for example, the first subset 210A of memory resources, the second subset 210B of memory resources, and/or the like. Data occupying memory resources included in the first subset 210A of memory resources may be assigned to a different weight class (e.g., the first weight class $w_1$) than data occupying memory resources included in the second subset 210B of memory resources (e.g., the second weight class $w_2$).

At 304, the first subset of memory resources may be divided, based at least on an age of the data occupying each memory resource included in the first subset of memory resources, into a first plurality of buckets of memory resources. For instance, as shown in FIG. 2B, the first subset 210A of memory resources may be further divided into a plurality of buckets of memory resources including, for example, the first bucket 220A of memory resources, the second bucket 220B of memory resources, the third bucket 220C of memory resources, and/or the like. The cache manager 140 may divide the first subset 210A of memory resources by at least sorting the memory resources included in the first subset 210A of memory resources based on an age of the data occupying each of the memory resources included in the first subset 210A of memory resources. Furthermore, no more than a threshold quantity (e.g., 1000 and/or a different quantity) of memory resources may be added to the first bucket 220A of memory resources, the second bucket 220B of memory resources, and/or the third bucket 220C of memory resources. As such, all of data occupying the first bucket 220A of memory resources may be accessed either more recently and/or less recently than all of the data occupying the second bucket 220B of memory resources. Alternatively and/or additionally, all of the data occupying the second bucket 220B of memory resources may be accessed either more recently or less recently than all of the data currently occupying the third bucket 220C of memory resources.

At 306, the second subset of memory resources may be divided, based at least on an age of the data occupying each memory resource included in the second subset of memory resources, into a second plurality of buckets of memory resources. For example, referring again to FIG. 2B, the second subset 210B of memory resources may also be divided into a plurality of buckets of memory resources including, for example, the fourth bucket 230A of memory resources, the fifth bucket 230B of memory resources, and/or the like. The second subset 210B of memory resources may also be sorted based on the age of data occupying each memory resource included in the second subset 210B of memory resources. Moreover, no more than a threshold quantity (e.g., 1000 and/or a different quantity) of memory resources may be added to the fourth bucket 230A of memory resources and/or the fifth bucket 230B of memory resources.

Figure 4:
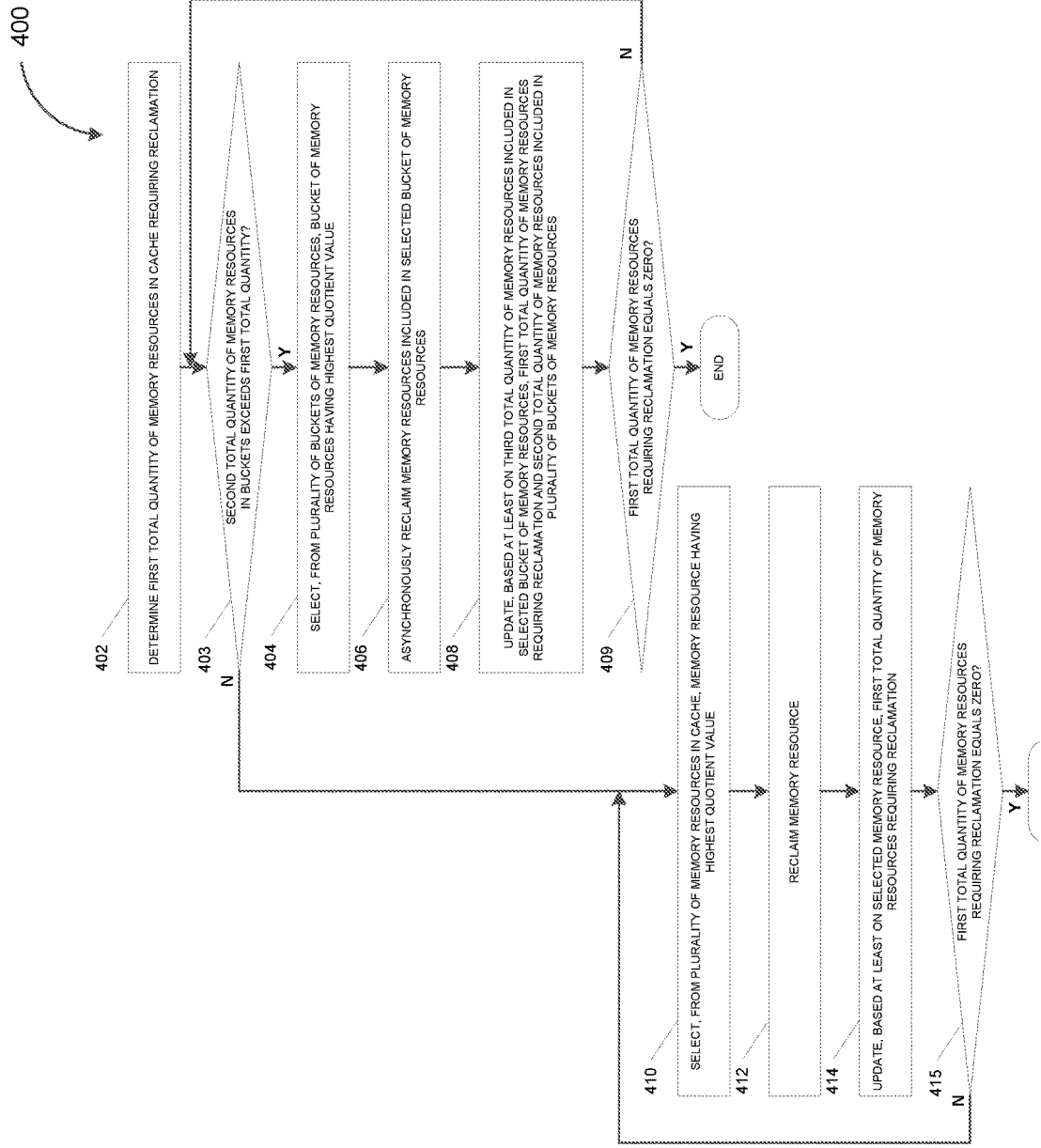
FIG. 4 depicts a flowchart illustrating a process for reclaiming memory resources in a cache, in accordance with some example embodiments.

FIG. 4 depicts a flowchart illustrating a process 400 for reclaiming memory resources in a cache, in accordance with some example embodiments. Referring to FIGS. 1-4, the process 400 may be performed by the cache manager 140.

At 402, the cache manager 140 may determine that a first total quantity of memory resources in the cache 145 requiring reclamation. For example, the cache manager 140 may determine that a total quantity U (e.g., a U quantity of bytes) of memory resources at the cache 145 in response to a shortage of available memory resources in the cache 145 for storing new data loaded from the database 115. When the cache 145 is determined to have a shortage of available memory resources, the cache manager 140 may reclaim at least some of the memory resources in the cache 145 such that new data from the database 115 may be stored in the reclaimed memory resources.

At 403, the cache manager 140 may determine whether a second total quantity of memory resources included in a plurality of buckets of memory resources exceeds the first total quantity of memory resources requiring reclamation. In some example embodiments, the cache manager 140 may track a total quantity S of memory resources included in the k quantity of buckets of memory resources. The total quantity S of memory resources included in the k quantity of buckets of memory resources may be a sum of the respective size $s_k$ of each of the k quantity of buckets of memory resources. For example, the total quantity S of memory resources may correspond to a total quantity of bytes of memory resources included in the k quantity of buckets of memory resources. As such, referring again to FIG. 2B, the total quantity S of memory resources included in the k quantity of buckets of memory resources may be computed based on Equation (2) below.

$$S = \sum_{i=1}^{k} s_i \qquad (2)$$

At 403-N, the cache manager 140 may determine that the second total quantity of memory resources included in the plurality of buckets of memory resources does exceed the first total quantity of memory resources requiring reclamation. In some example embodiments, the cache manager 140 may determine that the buckets of memory resources do not include a larger quantity of memory resources than the total quantity U of memory resources requiring reclamation. For example, the cache manager 140 may determine that the total quantity S of memory resources included in the k quantity of buckets of memory resources is equal to and/or less than the total quantity U of memory resources requiring reclamation (e.g., $S \leq U$). As such, the cache manager 140 may determine that the memory resources at the cache 145 may be reclaimed by the bucket and not individually.

Accordingly, at 404, the cache manager 140 may select, from the plurality of buckets of memory resources, a bucket of memory resources having a highest quotient q value. As noted, the quotient q value of a bucket of memory resources may be determined in accordance with Equation (1). For instance, the quotient q value of a bucket of memory resources may correspond to the weight class associated with the bucket of memory resources and an age of the least recently accessed data occupying a memory resource included in the bucket of memory resources. The cache manager 140 may be configured to select a bucket of memory resources (e.g., the first bucket 220A of memory resources and/or the like) having the highest quotient q value. In doing so, the cache manager 140 may select a bucket of memory resources associated with the smallest weight class relative to an age of a least recently accessed data occupying a memory resources within the bucket of memory resources.

At 406, the cache manager 140 may asynchronously reclaim the memory resources included in the selected bucket of memory resources. For example, if the cache manager 140 selected the first bucket 220A of memory resources (or another bucket of memory resources) at operation 404, the cache manager 140 may reclaim the memory resources included in that bucket of memory resources, for example, by marking the data occupying these memory resources to indicate that the data may be overwritten with other data from the database 115. As noted, in the event that the cache manager 140 selects multiple buckets of memory resources for reclamation, the cache manager 140 may reclaim the memory resources included in these buckets of memory resources simultaneously.

Furthermore, at 408, the cache manager 140 may update, based on a third total quantity of memory resources included in the selected bucket of memory resources, the first total quantity of memory resources requiring reclamation and the second total quantity of memory resources included in the plurality of buckets of memory resources. For example, the cache manager 140 may update the total quantity U of memory resources requiring reclamation by at least subtracting, from the total quantity U of memory resources requiring reclamation, a total quantity $s_k$ of memory resources included in the bucket of memory resources selected at operation 404 and/or reclaimed at operation 406. Alternatively and/or additionally, the cache manager 140 may update the total quantity S of memory resources included in the k quantity of buckets of memory resources by at least subtracting, from the total quantity S, the total quantity $s_k$ of memory resources included in the bucket of memory resources selected at operation 404 and/or reclaimed at operation 406.

At 409, the cache manager 140 may determine whether the first total quantity of memory resources requiring reclamation is zero. In some example embodiments, the cache manager 140 may determine whether a sufficient quantity of memory resources have been reclaimed based on the total quantity U of memory resources requiring reclamation. As noted, the total quantity U of memory resources requiring reclamation may be updated (e.g., at operation 408) whenever a bucket of memory resources is selected for reclamation and/or is reclaimed. If the cache manager 140 determines, at 409-Y, that the first total quantity of memory resources requiring reclamation is zero, the process 400 may terminate. That is, the process 400 for reclaiming memory resources may terminate if the total quantity U of memory resources requiring reclamation is zero, indicating that all of the memory resources requiring reclamation have been identified and/or reclaimed.

Alternatively and/or additionally, at 409-N, the cache manager 140 may determine that the first total quantity of memory resources requiring reclamation is not zero. For example, the cache manager 140 may determine that additional memory resources may still need to be reclaimed if the total quantity U of memory resources requiring reclamation is not zero. As such, the process 400 may resume at operation 403 and the cache manager 140 may again determine whether the second total quantity of memory resources included in the plurality of buckets of memory resources exceeds the first total quantity of memory resources requiring reclamation. For example, at 403-N, the cache manager 140 may determine that the second total quantity of memory resources included in the plurality of buckets of memory resources does not exceed the first total quantity of memory resources requiring reclamation. As such, the process 400 may resume again at operation 404 and the cache manager 140 may select, from the plurality of buckets of memory resources, another bucket of memory resources having a highest quotient q value.

Alternatively and/or additionally, at 403-Y, the cache manager 140 may determine that the second total quantity of memory resources included in the plurality of buckets of memory resources does exceed the first total quantity of memory resources requiring reclamation. In some example embodiments, the cache manager 140 may determine that the buckets of memory resources do include a larger quantity of memory resources than the total quantity U of memory resources requiring reclamation. For example, the cache manager 140 may determine that the total quantity S of memory resources included in the k quantity of buckets of memory resources is greater than the total quantity U of memory resources requiring reclamation (e.g., S≤U). When the total quantity S of memory resources included in the k quantity of buckets of memory resources exceeds the total quantity U of memory resources requiring reclamation, memory resources in the cache 145 may not be reclaimed by the bucket. Instead, the cache manager 140 may determine that the memory resources at the cache 145 may be reclaimed individually instead of by the bucket, as any single bucket of memory resources may include a larger quantity of memory resources than the quantity of memory resources requiring reclamation.

In the event that second total quantity of memory resources included in the plurality of buckets of memory resources does exceed the first total quantity of memory resources requiring reclamation, the cache manager 140 may, at 410, select, from the plurality of memory resources included in the cache 145, a memory resource having a highest quotient q value. The cache manager 140 may also reclaim, at 412, the selected memory resource. As noted, the cache manager 140 may reclaim memory resources in the cache 145 individually, when the quantity of memory resources included in any single bucket of memory resources exceeds the quantity of memory resources requiring reclamation. Here, the cache manager 140 may select which memory resources to reclaim based at least on the weight class and/or an age of the data occupying the memory resources. The cache manager 140 may select to reclaim memory resources occupied by data that is assigned a lower weight class and/or was accessed less recently. Furthermore, at 414, the cache manager 140 may update, based on the selected memory resource, the first total quantity of memory resources requiring reclamation. For example, the cache manager may update the total quantity U of memory resources requiring reclamation by at least subtracting, the total quantity U of memory resources requiring reclamation, the quantity of memory resources that are reclaimed individually.

At 415, the cache manager 140 may determine whether the first total quantity of memory resources requiring reclamation is zero. In some example embodiments, the cache manager 140 may determine whether a sufficient quantity of memory resources have been reclaimed individually based on the total quantity U of memory resources requiring reclamation. The total quantity U of memory resources requiring reclamation may be updated (e.g., at operation 414) whenever an individual memory resource is selected for reclamation and/or is reclaimed. If the cache manager 140 determines, at 415-Y that the first total quantity of memory resources requiring reclamation is zero, the process 400 may terminate. For instance, the process 40 may end when the total quantity U of memory resources requiring reclamation is zero, indicating that all of the memory resources requiring reclamation have been identified and/or reclaimed.

Alternatively and/or additionally, at 415-N, the cache manager 140 may determine that the first total quantity of memory resources requiring memory reclamation is not zero. For example, the cache manager 140 may determine that additional memory resources may still need to be reclaimed if the total quantity U of memory resources requiring reclamation is not zero. Accordingly, the process 400 may continue at operation 410 and the cache manager 140 may select, from the plurality of memory resources included in the cache 145, another memory resource having the highest quotient q value. For instance, at 410, the cache manager 140 may continue to reclaim memory resources in the cache 145 individually by at least selecting, from the plurality of memory resources included in the cache 145, another memory resource having a highest quotient q value.

Figure 5:
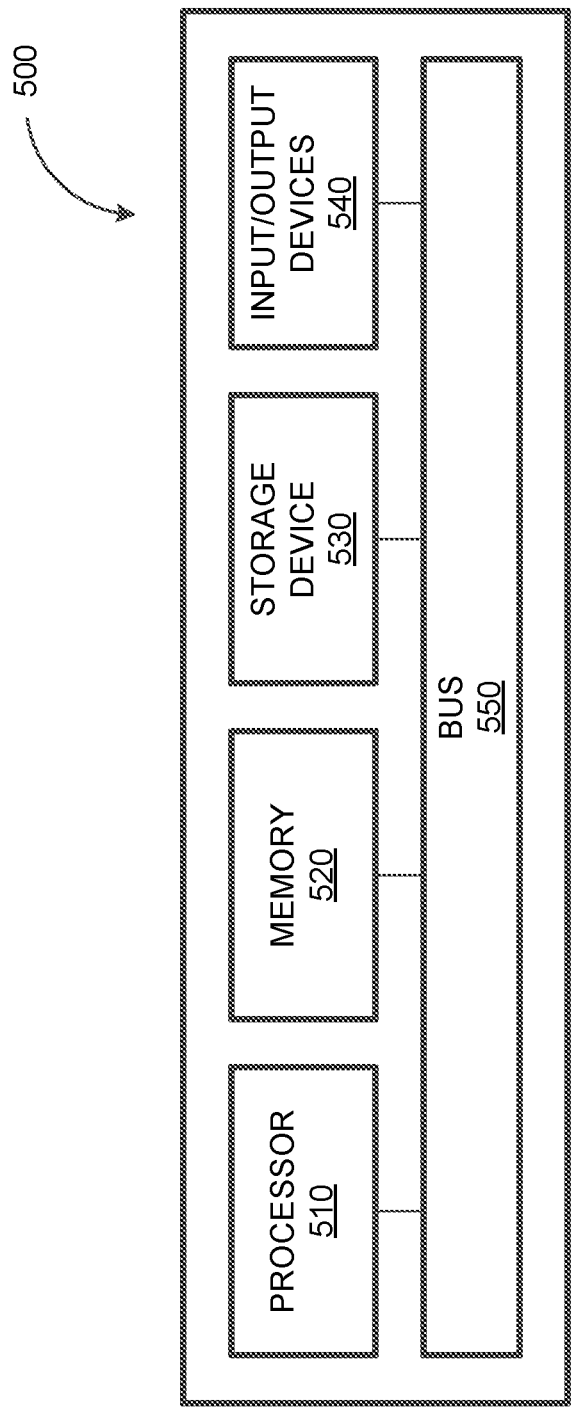
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the cache manager 140 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the cache manager 140. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP IntegratedBusiness Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   partitioning, into a first subset of memory resources and a second subset of memory resources, a plurality of memory resources included in a cache coupled with a database, the plurality of memory resources storing data from the database, the plurality of memory resources being divided based at least on a weight class assigned to data occupying each of the plurality of memory resources, the first subset of memory resources being associated with the first weight class, and the second subset of memory resources being associated with the second weight class;
   dividing the first subset of memory resources into at least a first portion of memory resources, the first portion of memory resources being occupied by data assigned to the first weight class;
   dividing the second subset of memory resources into at least a second portion of memory resources, the second portion of memory resources being occupied by data assigned to the second weight class;
   selecting, based at least on a first ratio of the first weight class relative to a first age of a first least recently accessed data occupying the first portion of memory resources, the first portion of memory resources, the first portion of memory resources being selected based at least on the first ratio being higher than a second ratio of the second weight class relative to a second age of a second least recently accessed data occupying the second portion of memory resources; and
   in response to the selection of the first portion of memory resources, reclaiming the first portion of memory resources.

2. The system of claim 1, further comprising:
   identifying the first least recently accessed data occupying the first portion of memory resources by at least sorting, based at least on an age of data occupying the first subset of memory resources, the first subset of memory resources prior to dividing the first subset of memory resources; and
   identifying the second least recently used data occupying the second portion of memory resources by at least sorting, based at least on an age of data occupying the second subset of memory resources, the second subset of memory resources prior to dividing the second subset of memory resources.

3. The system of claim 2, wherein the first subset of memory resources is further divided to form a third portion of memory resources, wherein the second subset of memory resources is further divided to form a fourth portion of memory resources, wherein the first subset of memory resources is divided such that the data occupying the first portion of memory resources is accessed more recently than data occupying the third portion of memory resources, and wherein the second subset of memory resources is divided such that the data occupying the second portion of memory resources is accessed more recently than data occupying the fourth portion of memory resources.

4. The system of claim 3, further comprising:
   selecting, based at least on the second ratio being higher than a third ratio of the first weight class and a third age of a third least recently accessed data occupying the third portion of memory resources, the second portion of memory resources; and in response to the selection of the second portion of memory resources, reclaiming the second portion of memory resources, the first portion of memory resources and the second portion of memory resources being reclaimed asynchronously.

5. The system of claim 1, wherein the reclamation of the first portion of memory resources includes marking the data occupying the first portion of memory resources to indicate that the data can be overwritten with other data from the database.

6. The system of claim 1, wherein the first weight class corresponds to an importance and/or a priority of the data occupying the first portion of memory resources, and wherein the second weight class corresponds to an importance and/or a priority of the data occupying the second portion of memory resources.

7. The system of claim 1, further comprising:
determining whether a quantity of memory resources included in the first portion of memory resources and/or the second portion of memory resources exceeds a total quantity of memory resources requiring reclamation; and
in response to determining that the quantity of memory resources included in the first portion of memory resources and/or the second portion of memory resources exceeds the total quantity of memory resources requiring reclamation, reclaiming a first memory resource from the plurality of memory resources before reclaiming a second memory resource from the plurality of memory resources, the first memory resource being reclaimed before the second memory resource based at least on a respective weight class and/or a respective age of data occupying the first memory resource and the second memory resource.

8. The system of claim 7, further comprising:
in response to determining that the quantity of memory resources included in the first portion of memory resources and/or the second portion of memory resources does not exceed the total quantity of memory resources requiring reclamation:
selecting to reclaim the first portion of memory resources and/or the second portion of memory resources; and
updating, based at least on the quantity of memory resources included in the first portion of memory resources and/or the second portion of memory resources, the total quantity of memory resources requiring reclamation.

9. The system of claim 1, wherein the first portion of memory resources is selected in response to a shortage of memory resources at the cache for storing additional data from the database, and wherein the data occupying the first portion of memory resources is replaced with the additional data from the database.

10. A computer-implemented method, comprising:
partitioning, into a first subset of memory resources and a second subset of memory resources, a plurality of memory resources included in a cache coupled with a database, the plurality of memory resources storing data from the database, the plurality of memory resources being divided based at least on a weight class assigned to data occupying each of the plurality of memory resources, the first subset of memory resources being associated with the first weight class, and the second subset of memory resources being associated with the second weight class;
dividing the first subset of memory resources into at least a first portion of memory resources, the first portion of memory resources being occupied by data assigned to the first weight class;
dividing the second subset of memory resources into at least a second portion of memory resources, the second portion of memory resources being occupied by data assigned to the second weight class;
selecting, based at least on a first ratio of the first weight class relative to a first age of a first least recently accessed data occupying the first portion of memory resources, the first portion of memory resources, the first portion of memory resources being selected based at least on the first ratio being higher than a second ratio of the second weight class relative to a second age of a second least recently accessed data occupying the second portion of memory resources; and
in response to the selection of the first portion of memory resources, reclaiming the first portion of memory resources.

11. The method of claim 10, further comprising:
identifying the first least recently accessed data occupying the first portion of memory resources by at least sorting, based at least on an age of data occupying the first subset of memory resources, the first subset of memory resources prior to dividing the first subset of memory resources; and
identifying the second least recently used data occupying the second portion of memory resources by at least sorting, based at least on an age of data occupying the second subset of memory resources, the second subset of memory resources prior to dividing the second subset of memory resources.

12. The method of claim 11, wherein the first subset of memory resources is further divided to form a third portion of memory resources, wherein the second subset of memory resources is further divided to form a fourth portion of memory resources, wherein the first subset of memory resources is divided such that the data occupying the first portion of memory resources is accessed more recently than data occupying the third portion of memory resources, and wherein the second subset of memory resources is divided such that the data occupying the second portion of memory resources is accessed more recently than data occupying the fourth portion of memory resources.

13. The method of claim 12, further comprising:
selecting, based at least on the second ratio being higher than a third ratio of the first weight class and a third age of a third least recently accessed data occupying the third portion of memory resources, the second portion of memory resources; and
in response to the selection of the second portion of memory resources, reclaiming the second portion of memory resources, the first portion of memory resources and the second portion of memory resources being reclaimed asynchronously.

14. The method of claim 10, wherein the reclamation of the first portion of memory resources includes marking the data occupying the first portion of memory resources to indicate that the data can be overwritten with other data from the database.

15. The method of claim 14, wherein the first weight class corresponds to an importance and/or a priority of the data occupying the first portion of memory resources, and wherein the second weight class corresponds to an importance and/or a priority of the data occupying the second portion of memory resources.

16. The method of claim 10, further comprising:
    determining whether a quantity of memory resources included in the first portion of memory resources and/or the second portion of memory resources exceeds a total quantity of memory resources requiring reclamation; and
    in response to determining that the quantity of memory resources included in the first portion of memory resources and/or the second portion of memory resources exceeds the total quantity of memory resources requiring reclamation, reclaiming a first memory resource from the plurality of memory resources before reclaiming a second memory resource from the plurality of memory resources, the first memory resource being reclaimed before the second memory resource based at least on a respective weight class and/or a respective age of data occupying the first memory resource and the second memory resource.

17. The method of claim 16, further comprising:
    in response to determining that the quantity of memory resources included in the first portion of memory resources and/or the second portion of memory resources does not exceed the total quantity of memory resources requiring reclamation:
        selecting to reclaim the first portion of memory resources and/or the second portion of memory resources; and
        updating, based at least on the quantity of memory resources included in the first portion of memory resources and/or the second portion of memory resources, the total quantity of memory resources requiring reclamation.

18. A non-transitory computer-readable medium storing instructions, which when executed by at least one data processor, result in operations comprising:
    partitioning, into a first subset of memory resources and a second subset of memory resources, a plurality of memory resources included in a cache coupled with a database, the plurality of memory resources storing data from the database, the plurality of memory resources being divided based at least on a weight class assigned to data occupying each of the plurality of memory resources, the first subset of memory resources being associated with the first weight class, and the second subset of memory resources being associated with the second weight class;
    dividing the first subset of memory resources into at least a first portion of memory resources, the first portion of memory resources being occupied by data assigned to the first weight class;
    dividing the second subset of memory resources into at least a second portion of memory resources, the second portion of memory resources being occupied by data assigned to the second weight class;
    selecting, based at least on a first ratio of the first weight class relative to a first age of a first least recently accessed data occupying the first portion of memory resources, the first portion of memory resources, the first portion of memory resources being selected based at least on the first ratio being higher than a second ratio of the second weight class relative to a second age of a second least recently accessed data occupying the second portion of memory resources; and
    in response to the selection of the first portion of memory resources, reclaiming the first portion of memory resources.

* * * * *